Nov. 27, 1928.
M. MASON
1,692,849
METHOD OF DETERMINING THE NATURE OF SUBSOIL
Filed May 3, 1926
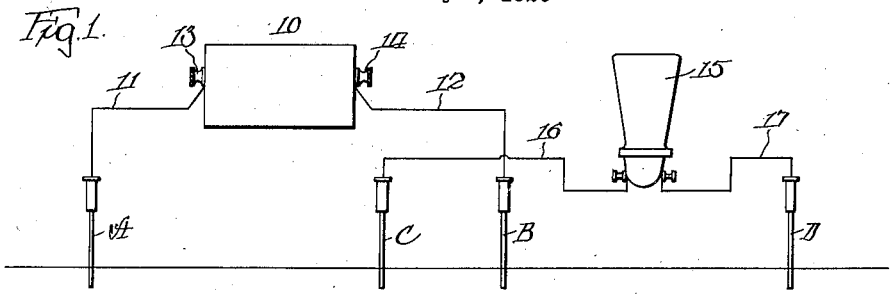
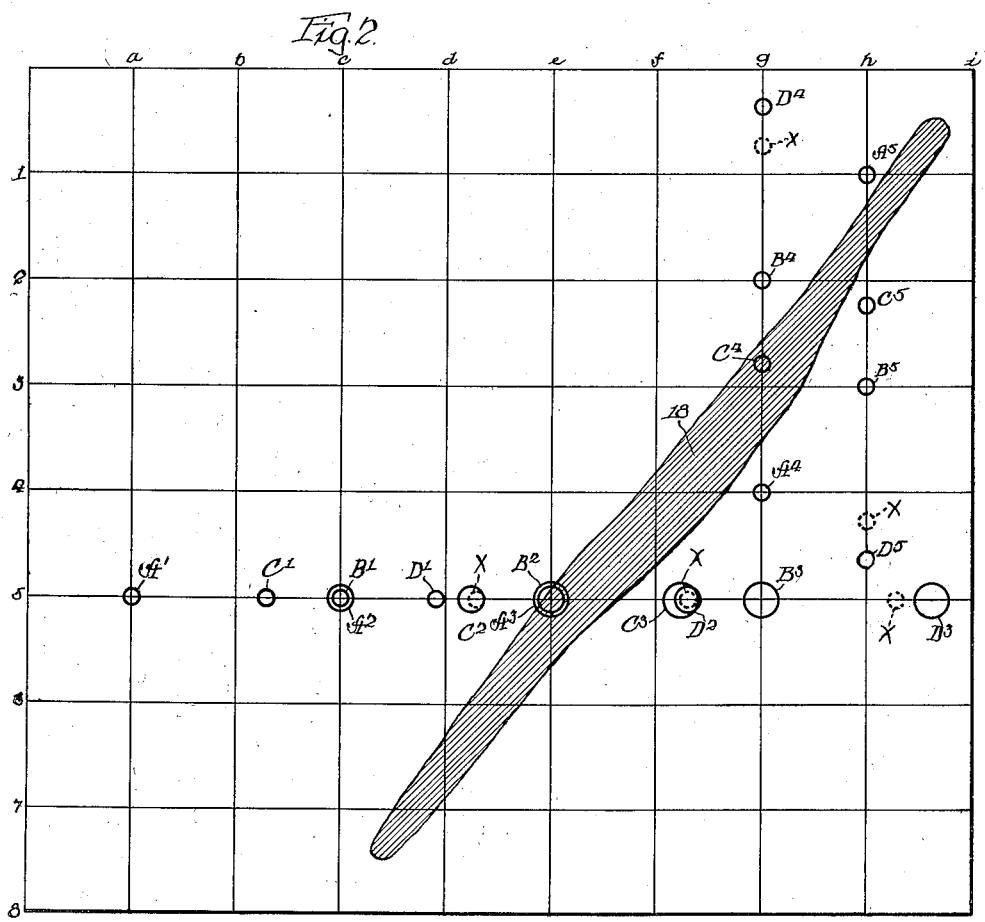
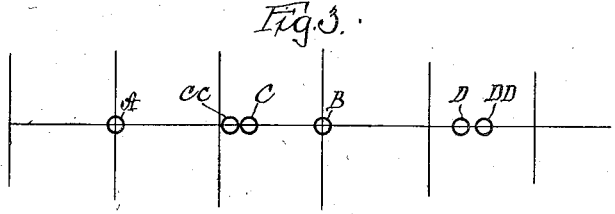
Inventor:
Max Mason
By George I. Haight
His Atty.

Patented Nov. 27, 1928.

1,692,849

UNITED STATES PATENT OFFICE.

MAX MASON, OF CHICAGO, ILLINOIS.

METHOD OF DETERMINING THE NATURE OF SUBSOIL.

Application filed May 3, 1926. Serial No. 106,188.

This invention relates to improvements in method of determining the nature of subsoil.

One object of the invention is to provide a method of discovering and locating ore deposits, mineral deposits, or any hidden body having electro-magnetic properties differing from those of the surroundings.

Another object of the invention is to provide a method of the character indicated in the preceding paragraph, wherein observations are taken in a systematic manner by means of two sets of electrodes or terminals, one set communicating with a source of electrical energy and the other set communicating with an indicating means, the set of electrodes communicating with the source of electrical energy supplying energy to the ground and spaced a predetermined distance apart, and the terminals of the detecting set being placed in electrical connection with the earth, one of said last-named terminals being placed a distance from one of the terminals of the first set, and the other terminal of the detecting set being adjusted relative to the first terminals along a straight line to a position characterized by its potential or phase with respect to the other terminal of the detecting set, the relative position of these terminals indicating the electromagnetic character of the subsoil.

A further object of the invention is to provide a method of the character specified, wherein a plurality of successive observations are taken by means of two sets of terminals, one set communicating with a source of electromagnetic energy and the other set communicating with an indicating device, three of the terminals, including the two terminals communicating with the source of energy and one of the terminals communicating with the indicating means being spaced apart a predetermined distance during each observation all four of the terminals being moved to a different position at each succeeding observation while keeping the relative spacing between the terminals referred to constant, the relative position of the remaining terminal being adjusted during each observation until a point is found having a predetermined electrical character relative to the other terminal connected to the indicating means.

A still further object of the invention is to provide a method of the character indicated, wherein a plurality of sets of observations are taken by means of a pair of terminals in circuit with a source of electrical energy, and a second pair of terminals in circuit with an indicating means, the first pair of terminals being positioned a predetermined distance apart during each set of observations and one of the terminals of the second pair being successively placed at predetermined different distances from one of the terminals of the first pair during each set of observations, and the remaining terminal of the second pair being disposed at such a position with reference to the other three terminals during the successive observations of each set that one terminal of the second pair will be at a certain potential or phase with respect to the other terminal of said pair.

Still another object of the invention is to provide a method of detecting ore deposits, mineral deposits or any hidden body having electro-magnetic properties different from its surroundings by means of a pair of terminals in circuit with a source of electrical energy, and a second pair of terminals in circuit with an indicating means wherein observations are taken successively along a straight line, the terminals being all moved to different positions along said line during each succeeding observation and the terminals of the first pair and one of the terminals of the second pair being disposed a predetermined distance apart during each succeeding observation and the remaining terminal of said second pair being disposed at a point on said straight line with reference to the other terminal of said second pair characterized by the potential or phase of one terminal of the second pair with reference to the other terminal of said pair.

A more specific object of the invention is to provide a method in accordance with the preceding paragraph, wherein observations are taken on a set of parallel lines, or a plurality of sets of parallel lines, wherein one of said sets of parallel lines intersect the other set.

Yet another object of the invention is to provide a method of detecting ore deposits, mineral deposits, or any hidden body having electromagnetic properties differing from its surroundings by means of a pair of terminals in circuit with a source of electrical energy and a second pair of terminals in circuit with an indicating means, wherein observations are taken successively along a straight line, the terminals being all moved to different positions along said line during each succeeding observation, and the terminals of the first set and one of the terminals of the second set being disposed the same predetermined constant distance apart during each succeeding observation and the remaining terminal of said second set being disposed at such a point on said straight line with reference to the other terminal of said second pair that it will be at a certain potential or phase with respect to the other terminal of said second pair.

Other and further objects and advantages of the invention will more fully and clearly appear from the description and claims hereinafter following.

In the drawing forming a part of this specification, Figure 1 is a diagrammatic view showing in side elevation a form of apparatus employed in connection with my improved method. Figure 2 is a diagrammatic plan view illustrating a manner in which observations are taken in accordance with my improved method. And Figure 3 is a diagrammatic view illustrating another manner of taking observations in accordance with the improved method.

In said drawings, A and B designate two electric terminals or electrodes in circuit with a source of electrical energy 10, the electrodes A and B being connected by wires 11 and 12 respectively to terminals 13 and 14 mounted on a container housing the source of electromagnetic energy. Two additional terminals are designated by C and D, these terminals being illustrated as of substantially the same design as the terminals A and B. In this connection it is pointed out that although the terminals are all shown as of the same design, terminals of other design and character may be employed. The terminals C and D are in circuit with an indicating means 15 which is preferably in the form of a sensitive telephone receiver. The terminals C and D are connected with terminals on the receiver 15 by means of wires 16 and 17. The apparatus described, which is shown diagrammatically, is one form which may be employed in carrying out my improved method and is of the type illustrated in Patent Number 817,736, granted April 10, 1906, to Draft and Williams. In other words, this apparatus is herein shown for illustrative purposes only, and any other apparatus serving a similar function may be employed, it being necessary merely to provide a pair of terminals which form the primary circuit and are connected with a source of electromagnetic energy which may be such as to provide continuous, fluctuating, or impulsive difference of potential between the two terminals and a second pair of terminals which form the secondary circuit and are connected to an indicating apparatus which may take the form of any suitable device commonly employed for this purpose, including sensitive telephone receivers, galvanometers, etc.

The terminals A, B, C and D employed, shown in the drawings, are of the type illustrated in the Draft and Williams patent hereinbefore referred to. However, it is within my invention to employ other types of terminals including capacity couplings and condensers which are merely placed adjacent to the earth's surface and do not have direct contact with the earth as is the case with the terminals illustrated in the patent referred to.

In exploring a tract for ore by my improved method, the electrodes or terminals A and B are placed at a suitable separation as indicated at $A^1$ and $B^1$ shown by the small circles in Figure 2, and the electrode of terminal C is fixed at a predetermined position with reference to $B^1$ as indicated at $C^1$, the electrodes A, B and C being preferably in the same straight line indicated by 5. The electrode or terminal D is then moved along the line 5 until a point is located at which the indicating apparatus 15 shows a minimum current intensity. In the case of uniform conducting soil, the terminal D will be located at the point shown by the small broken circle $x$. Such a relative position would usually indicate that no ore is present; in other words, the same is a zero indication. In this connection, it is pointed out that the minimum current intensity indicated may be zero in which case the points at which the electrodes C and D are located are at the same potential. When there is ore present in the sub-soil, the position of the electrode D will vary with respect to the point $x$, the direction depending upon the location of the ore. A vein or body of ore is indicated by 18 in Figure 2. Due to the influence of the body of ore, the electrode D will be located at a position indicated by the small circle $D^1$ when the indication of minimum current intensity is shown by the apparatus 15. It will be noted that the position $D'$ is closer to the electrode $B'$ than the point $x$, thus indicating that the ore is located to the right as shown in Figure 2. The distance between the electrodes C and D or the distance between the electrodes B and D may be interpreted to afford information about the electro-magnetic properties of the sub-soil, taking account also of the positions of the electrodes C, A and B with respect to each other.

After the observation just described has been noted, another observation is taken along the straight line 5, the electrode A being moved a definite predetermined distance along said line to the position indicated by the large circle $A^2$, the electrode B being spaced from the electrode A a distance corresponding to the distance between the electrodes A and B during the first observation. The electrode B will thus be located at the position indicated by the circle $B^2$. The electrode C is fixed between the electrodes A and B at a distance from the electrode B corresponding to the distance between these electrodes during the first observation. The electrode D is then moved along the line 5 until an indication of minimum current intensity is again registered. With the body of ore 18 located as shown, the electrode D will be located at the position indicated by the circle $D^2$.

Further observations are then taken along the line 5 at equally spaced points, the terminals A, B and C being always spaced apart the same fixed distance as in the preceding observation, and the terminal D being moved along the line 5 until the minimum current intensity is registered by the indicating apparatus 15. The positions of the electrodes A, B, C and D at the third observation are indicated by the circles $A^3$, $B^3$, $C^3$ and $D^3$. The observations are thus repeated along the same straight line until the length of the tract has been explored in one direction. In taking these observations, the relative positions and distances of the electrodes A, B and C may easily be kept constant by means of spacing leads or cords between them, and the distance between the electrodes C and D, or B and D may be quickly measured in any suitable manner, preferably by a scale on the lead wire connecting the electrodes C and D. It will be evident that my improved method of exploring a track along a straight line possesses the decided advantage of requiring the minimum amount of clearing away of obstacles, clearing of timber, or brush cutting.

After completing any one of the observations described, the procedure may be repeated by using the same positions for the electrodes A and B, but several different predetermined positions of the electrode C. Two such observations, without changing the position of the electrodes A and B, are indicated in Figure 3, the location of the electrodes A and B being indicated by the small circles and the two positions of the electrode C being indicated respectively by the circles C and CC. The position of the electrode D will be located at D and DD respectively. By this procedure a more detailed interpretation of the electromagnetic nature of the subsoil in the particular zone will be obtained.

When the tract has been explored along one straight line as hereinbefore described, a series of observations are taken in a similar manner along a plurality of lines parallel to the first line and then along a plurality of parallel lines intersecting the first set of parallel lines. The intersecting lines may be at any angle and are herein illustrated at right angles to each other. In Figure 2, one set of lines along which observations are taken are indicated by 1, 2, 3, 4, 5, 6, 7 and 8, and the intersecting set of parallel lines are indicated by $a, b, c, d, e, f, g, h$ and $i$. For the purpose of clearness of illustration, the location of the electrodes during successive observations along a line have been shown in Figure 2 only in connection with line 5. In carrying out my invention, the first exploration will preferably be along the line 1 and then along the lines 2, 3, 4, 5, 6, 7 and 8, and along the lines $a, b, c, d, e, f, g, h$ and $i$ successively. Observations are preferably taken progressively on one line in one direction and then on the adjacent parallel line in the reverse direction. However, the observations along each set of parallel lines may be taken in the same direction. Observations taken in reverse directions on adjacent parallel lines are indicated by $A^4$, $B^4$, $C^4$, and $A^5$, $B^5$, $C^5$ and $D^5$ on the parallel lines $g$ and $h$.

The parallel lines 1 to 8, inclusive, and the parallel lines $a$ to $i$, inclusive, are preferably all spaced the same distance apart and the observations are taken at the intersections of the two sets of parallel lines, that is, the electrodes A and B are placed at the points of intersections of these lines as clearly indicated by $A^1$, $B^1$, $A^2$, $B^2$, $A^3$ and $B^3$ on line 5 of Figure 2. In the instance shown in this figure, the electrodes A and B are moved a distance equal to the spacing between two of these parallel lines when progressing from one observation to the next. It will be seen that a tract may thus be explored in a systematic and rapid way. Although I have shown and described the observations as taken at approximately equal intervals along parallel lines spaced equally apart, good results may be obtained when the observations are taken at unequal intervals on a straight line and the parallel lines along which observations are taken are not equally spaced. In the embodiment of the invention herein shown and described, in making each observation, the electrodes A, B, C and D are all located in the same straight line but it will be evident that my invention is not limited to this exact procedure, it merely being essential that the electrodes A and B are placed a predetermined distance apart on one line and that the electrode C is spaced a definite predetermined distance from the electrode B, but not necessarily on the straight line connecting the electrodes A and B, and the electrode D located so that there will be a certain potential or phase of the same with respect to the electrode C. In other words, the straight line connecting the electrodes C and D may be either parallel or at an angle to the straight line connecting the electrodes A and B. In all the various observations shown in Figure 2, the normal position for the terminal D, that is, the position this terminal would occupy if the soil were uniform conducting, has been indicated by $x$. The position of $D^3$ with reference to the normal position of the terminal D, indicates that the ore body is to the left in Figure 2. The position of $D^4$ indicates that the ore body is located toward the bottom and the position of $D^5$ indicates that the ore body is located toward the top of said figure with reference to the points $D^4$ and $D^5$ respectively. The position $D^2$ coincides with the normal position of the terminal D on account of the terminal B² being disposed directly above the body of ore.

The deviations in the normal distance between the electrode D and the electrode C, or between the electrode D and the electrode B indicates the presence of ore masses when the deviations form a systematic trend through the observations, which, as hereinbefore described, are taken step by step.

It will be evident that by my improved method, the tract is effectively explored at points on the corners of squares which form a checker-board pattern. Further, the entire apparatus may be readily transported and set up in constant geometry at every station, the same uniform sensitivity of result being obtained throughout the tract. Since the distance of D relative to B and C is used as an indication, no separate survey of points nor map is required, such as is needed in methods involving the plotting of equi-potential curves.

While I have herein shown and described what I now consider the preferred manner of carrying out my invention, the same is merely illustrative, and I contemplate all changes and modifications that come within the scope of the claims appended hereto.

I claim:

1. The method of determining the nature of subsoil, which consists in applying electromagnetic energy at two points of a given tract, fixing the position of a third point lying between said two points colinear with and spaced a predetermined distance therefrom, placing a fourth point also substantially colinear with the preceding three points and locating said fourth point at a distance from one of said other points so that there is a predetermined electrical relationship between said point and the fourth point, and noting the distances between the various points as an indication of the electromagnetic character of the subsoil.

2. The method of determining the nature of subsoil, which consists in applying electromagnetic energy between two points of a given tract, fixing the position of a third point lying between said two points and colinear therewith and at a predetermined distance from said points, locating in alinement with said points a fourth point by so positioning the same with reference to the third point as to distance that there will be a predetermined electrical relationship between the two last-named points, said fourth point being exterior to the two points at which the electromagnetic energy is applied, thereby obtaining a reading based on the distance between the four points as an indication of the electromagnetic character of the subsoil.

3. In a method of determining the nature of subsoil by means of a pair of electrodes in circuit with a source of electromagnetic energy and a second pair of electrodes in circuit with an indicating means, taking a plurality of observations successively on a straight line at spaced predetermined distances apart, disposing the electrodes of the first pair and one of the electrodes of the second pair a predetermined distance apart in a substantially straight line during each successive observation and the remaining electrode of said second pair at such a point as to distance on said straight line with reference to the other electrode of said second pair so that said indicating means will register a predetermined electrical relationship between the electrodes of the second pair.

In witness that I claim the foregoing I have hereunto subscribed my name this 27th day of April, 1926.

MAX MASON.